United States Patent [19]

O'Neil et al.

[11] Patent Number: 4,732,420
[45] Date of Patent: Mar. 22, 1988

[54] COMBINED HEADACHE RACK AND STORAGE COMPARTMENT FOR TRUCKS

[76] Inventors: Lorraine B. O'Neil, R.R. 1, Box 72; Jeffery M. Miller, R.R. 1, Box 73, both of Williston, N. Dak. 58801

[21] Appl. No.: 32,239

[22] Filed: Mar. 31, 1987

[51] Int. Cl.⁴ .............................................. B62D 25/00
[52] U.S. Cl. ..................................... 296/43; 296/37.1; 296/181; 280/423 R; 280/770; 105/347
[58] Field of Search ................. 296/43, 182, 1 R, 181, 296/37.1; 280/770, 762, 423 R, 748; 105/374

[56] References Cited

U.S. PATENT DOCUMENTS

| | | | |
|---|---|---|---|
| 3,047,161 | 7/1962 | Thacker | 280/770 |
| 3,049,363 | 8/1962 | Marx | 280/748 |
| 3,126,224 | 3/1964 | Carter, Jr. et al. | 296/181 |
| 3,155,419 | 11/1964 | Garson et al. | 296/181 |
| 3,493,263 | 2/1970 | Brown | 280/770 |
| 3,705,732 | 12/1972 | Marinelli | 296/182 |
| 3,907,057 | 9/1975 | Reddekopp | 296/183 |
| 4,438,968 | 3/1984 | Worthing | 296/1 R |

Primary Examiner—Robert R. Song
Attorney, Agent, or Firm—Fleit, Jacobson, Cohn & Price

[57] ABSTRACT

An attachment for trucks, particularly tractor units associated with a flat bed trailer having removable side boards, headboard and tailgate with the attachment being in the form of a headache rack attached to the frame of the truck forwardly of the trailer and being constructed in part from the side boards, headboard and tailgate of the trailer when the trailer is converted to a flat bed arrangement. The rack includes supporting stands attached to the frame rails of the truck frame which support a bottom pan with sockets receiving the stakes of the trailer headboard and tailgate enclosing a space receiving the side boards and stakes together with a top cap removably securing these components in place. This structure enables a flat bed trailer with a side kit to be utilized with the side kit in place thereon or converted to flat bed use in which the side kit forms part of the headache rack and a storage compartment for conveniently storing some components of the side kit and providing an arrangement which complies with regulations which require a headache rack when the front bulkhead has been removed from a trailer or when a flat bed trailer is not provided with a front bulkhead to protect the truck operator from a forwardly shifting load.

9 Claims, 4 Drawing Figures

COMBINED HEADACHE RACK AND STORAGE COMPARTMENT FOR TRUCKS

BACKGROUND OF THE INVENTION

1. Field of the Invention

The present invention generally relates to a truck attachment to enable the truck to comply with various safety regulations by providing a headache rack mounted on the truck frame behind the cab and in front of a towed trailer in which the headache rack utilizes some of the side kit components to form a storage compartment for the other side kit components so that when a flat bed trailer having side components mounted thereon is converted to a flat bed trailer, the removed components form a headache rack and a storage compartment for the remainder of the components so that the components can be easily stored and easily reassembled onto the flat bed trailer since all of the components are supported and located in an area immediately forwardly of the flat bed trailer and immediately rearwardly of the truck cab.

2. Description of the Prior Art

Safety regulations with respect to flat bed trailers require the use of a front bulkhead either on the trailer or mounted on the truck frame forwardly of the trailer and rearwardly of the cab in order to protect the operator from forwardly shifting loads. While flat bed trailers with front bulkheads are well known and headache racks attached to the truck frame immediately rearwardly of the truck cab and forwardly of the trailer are well known, in some load-carrying situations, it is necessary to provide a side kit which includes side boards, stakes, a headboard, a tailgate and in some instances top bows or trusses interconnecting the top edges of the side walls. When it is desired to utilize the trailer as a flat bed trailer, the components of the side kit must be removed and stored. In some instances, the side boards and tailgate are stored at the front of the trailer alongside the headboard and in some instances are stored below the trailer in compartments provided for such components. Such prior structures either require that the front bulkhead be retained permanently on the trailer or that an attached headache rack be mounted on the frame of the truck rearwardly of the cab. Such arrangements introduce problems of placing the side kit components in the storage compartments under the trailer and then lifting them back onto the flat trailer when their use is desired. The following U.S. Pat. Nos. relate to this field of endeavor.

2,596,478
3,040,363
3,126,224
3,155,419
3,433,470
3,907,057

SUMMARY OF THE INVENTION

An object of the present invention is to provide a combined headache rack and storage compartment mounted from the truck frame rearwardly of the truck cab and forwardly of the trailer in which components removed from the trailer to convert it to a flat bed trailer are used to form a headache rack and storage compartment for the side wall kit components thereby enabling the truck and trailer rig to comply with various safety regulations and at the same time provide a convenient storage area for the side kit components.

Another object of the invention is to provide a headache rack and storage compartment as set forth in the preceding object in which the headboard and tailgate removed from the trailer when converting it to a flat bed trailer are used as the front and rear components of the headache rack and storage compartment thereby providing a dual use for such components and saving weight by utilizing these components as the headache rack to enable a greater payload to be carried on the trailer without increasing the gross weight.

A further object of the invention is to provide a headache rack and storage compartment in accordance with the preceding objects which includes a pair of stands rigidly attached to the truck frame rails for supporting a horizontally disposed bottom pan having stake sockets receiving the stakes on the front headboard and tailgate and a top cap which engages the upper edges of the front headboard and tailgate when forming a headache rack with the components being easily assembled and disassembled when converting the trailer from and to flat bed operation.

Yet another important object of the present invention is to provide a combined headache rack and storage compartment which is simple in construction, easy to attach to existing trucks and capable of efficiently utilizing existing components to form a headache rack and storage compartment to comply with safety requirements and to conveniently and easily store various side kit components removed from the trailer when converting the trailer to flat bed operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
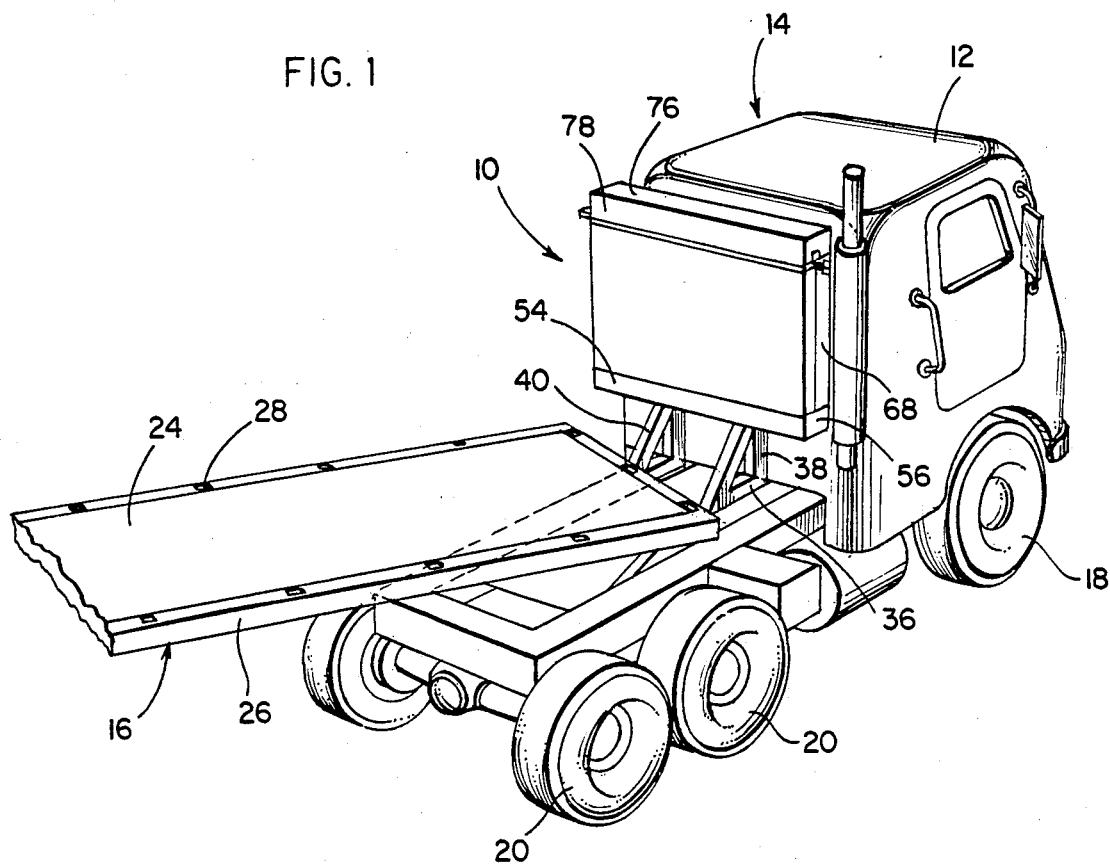
FIG. 1 is a perspective view of a truck and flat bed trailer illustrating the combined headache rack and storage compartment of the present invention associated therewith and mounted forwardly of the trailer and rearwardly of the truck cab.
Figure 2:
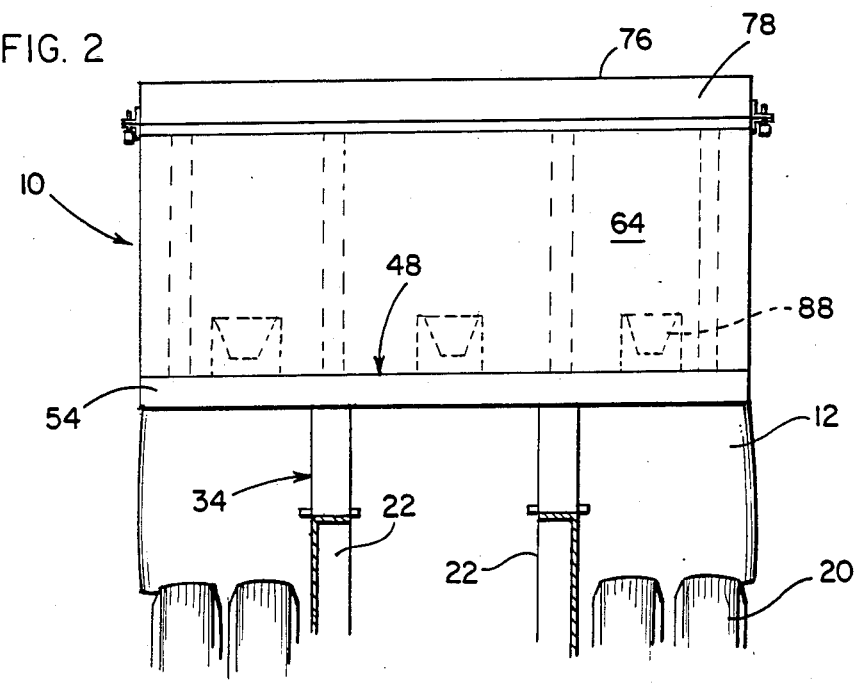
FIG. 2 is a rear elevational view of the combined headache rack and storage compartment.

The combination headache rack and side kit storage compartment of the present invention is generally designated by reference numeral 10 and is mounted rearwardly of the cab 12 of a truck generally designated by the numeral 14 which may be in the form of a tractor unit for towing a trailer generally designated by the numeral 16. The truck 14 includes the usual front steerable wheels 18 and drive wheels 20 which may be a single set of drive wheels, tandem wheels or the like. The structure of the truck is completely conventional and includes the usually provided longitudinal frame rails 22 which support the drive wheels, the associated drive shaft, axles, differential, springs and fifth wheel assembly by which the trailer 16 is connected to the truck in a conventional manner. The trailer 16 is a flat bed trailer and includes a deck 24 with a peripheral rail 26 having sockets 28 therein for receiving stakes 30 which support side boards, a headboard and tailgate in a conventional manner so that these components may be assembled onto the flat bed trailer or removed therefrom depending upon the load to be carried on the trailer. The structure of the trailer is conventional as are the stakes and side boards with the removable components being generally known as a side kit. These components, when not assembled onto the trailer are usually stored in a separate compartment or compartments oriented under the trailer deck 24 which requires considerable lifting and handling of the side kit components when storing these compartments or assembling them onto the flat bed trailer. Also, when the side kit is removed from the flat bed trailer and no front bulkhead or headboard remains on the trailer, the trailer cannot be used to carry a load without a bulkhead being placed forwardly of the trailer inasmuch as safety regulations require that such a bulkhead, known as a headache rack, be provided either on the front end of the trailer or on the truck frame rearwardly of the cab 12 to protect the driver and other occupants of the cab from the danger of a forwardly shifting load. Conventionally, a separate bulkhead or headache rack may be attached to the frame rails 22 of the truck 14 rearwardly of the cab 12 which, of course, reduces the payload which can be carried by the trailer in an amount equal to the weight of the separate headache rack.

The combination headache rack and side kit storage compartment of the present invention includes a supporting stand structure permanently attached to the frame rails 22 of the truck and utilizes the side kit components to form the major part of the headache rack and also a storage area for the remainder of the side kit components so that such components serve a dual purpose, that is they serve as a headache rack and as a structure for forming a storage compartment so that the payload is reduced only in an amount equal to the permanently attached stand which is substantially less than the reduction in payload caused by a permanently installed headache rack. Further, the storage of the side kit components immediately forwardly of the trailer deck 24 enables these components to be more easily stored and more easily assembled onto the trailer when desired.

Figure 3:
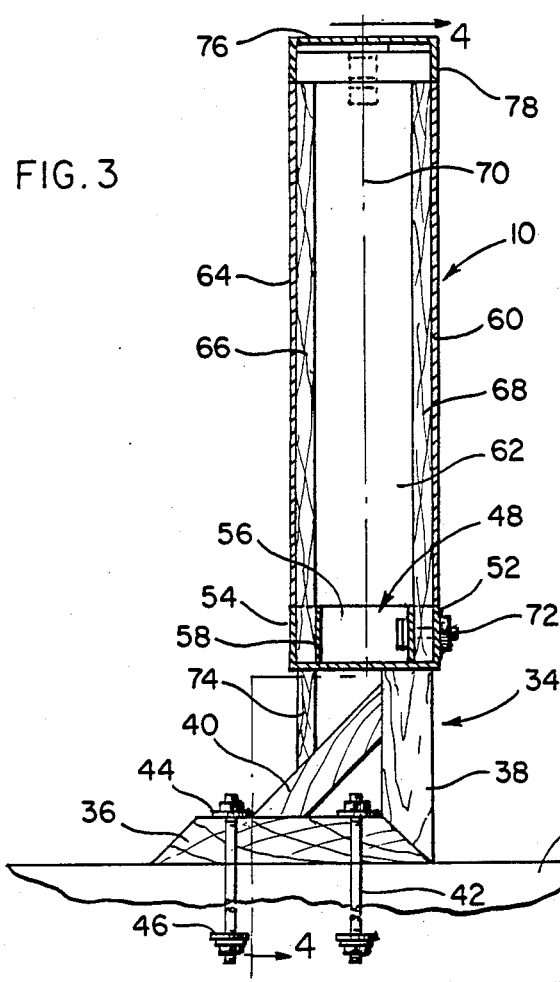
FIG. 3 is a vertical sectional view illustrating the structural details of the present invention.
Figure 4:
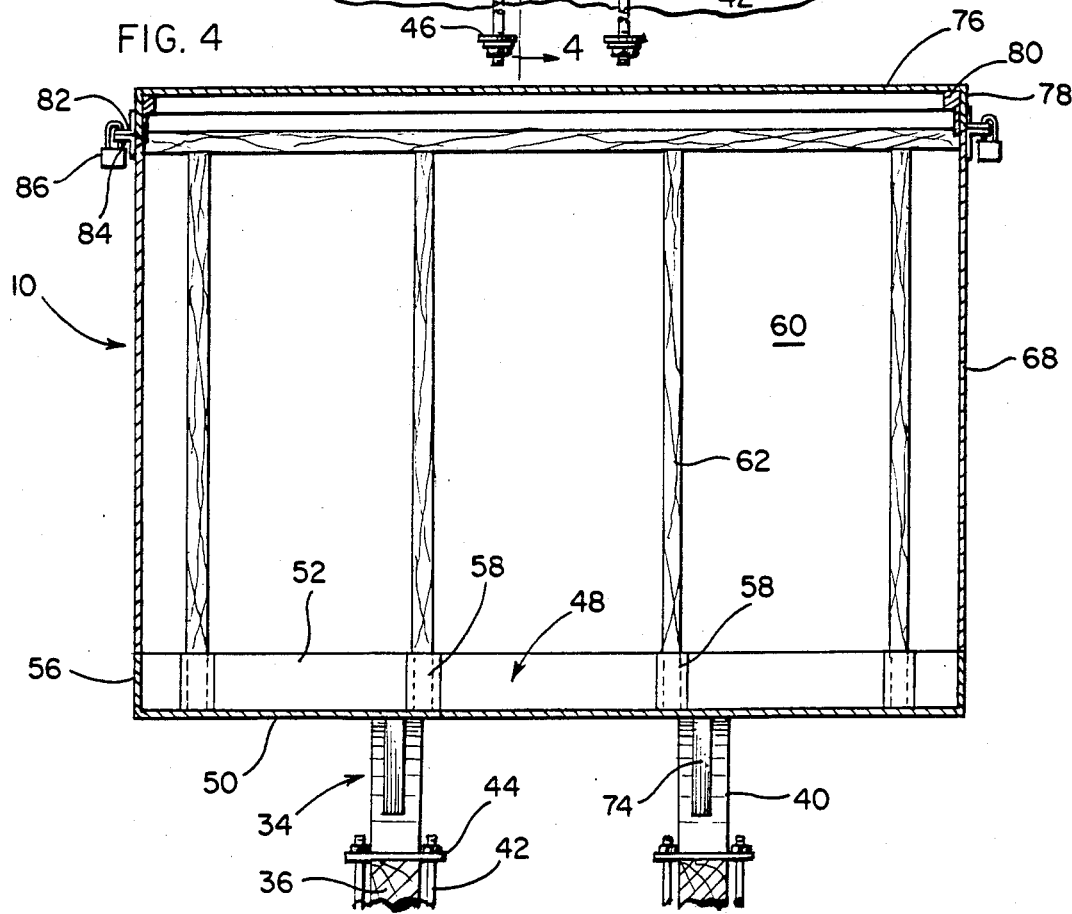
FIG. 4 is a longitudinal sectional view taken substantially upon a plane passing along section line 4—4 on FIG. 3 illustrating further structural details of the invention.

The combination headache rack and side kit storage compartment 10 includes a pair of stands 34 each of which includes a horizontally disposed base 36 positioned along the top surface of the truck or tractor frame rails 22 with the forward end of the base 36 including a vertical leg 38 rigid with respect thereto to form a right angular member with the leg 38 being braced by a diagonal brace 40 which extends between the top surface of the base 36 and the rearward surface of the vertical leg 38 as illustrated in FIG. 3. Each base 36 is secured to the frame rail 22 by a pair of bolts 42 extending through the ends of top plates 44 and bottom plates 46 with the top plates 44 overlying the top surface of the base 36 immediately rearwardly of the brace 40 and the bottom plate 46 underlying the frame rail 22 in order to rigidly and fixedly secure the stands 34 to the frame rails 22.

Rigidly affixed to the upper ends of the stands 34 is a bottom pan 48 which includes a bottom member 50, short front and rear walls 52 and 54 and end walls 56 all rigidly affixed to each other. The front and rear walls 52 and 54 are each provided with a plurality of upwardly opening stake sockets 58 which are of the same size and same spatial relation as the stake sockets 28 on the trailer 16 in order to detachably support the front bulkhead or headboard 60 by receiving the stakes 62 in the sockets 58 on the front wall 52 of the bottom pan 48. Likewise, the tailgate 64 is supported from the bottom pan 48 by its stakes 66 being received in the stake sockets 58 on the rear wall 54 of the bottom pan 48 thereby enabling the front headboard or bulkhead to be removed from the trailer and used as the front plate or panel of the combination headache rack and storage compartment 10. Likewise, the tailgate of the trailer is utilized as the rear plate or panel for the combination headache rack and storage compartment of the present invention. Both the front plate or front bulkhead or headboard 60 and the rear plate or tailgate 64 includes projecting edge flange portions 68 which substantially abut along vertical line 70 when these components are assembled on the bottom pan 48. Retaining bolts or pins 72 are provided in at least one or all of the sockets 58 to retain the bulkhead or headboard 60 in place. Also, each stand 34 is provided with a vertical brace 74 in alignment with the rear edge of the bottom pan 48 to provide additional support for the side kit components.

A top cap 76 is assembled to the top of the combination headache rack and storage compartment with the top cap including a depending peripheral flange 78 which telescopes over the upper ends of the bulkhead 60, the tailgate 64 and the side members 68 with the upper inner surface of the flange 78 including a stop block 80 to limit the telescopic movement and reinforce the top cap. The ends of the top cap 76 may each be provided with a projecting tongue or lug 82 matching with a corresponding lug 84 on the side member 68 on the tailgate for receiving a lock 86 to secure the components in assembled relation. The cap 76 may be supported detachably in any suitable manner from the upper ends of the bulkhead 60 and tailgate 64 to form a closure for the space between the tailgate 64 and the bulkhead 60. This space enables the side boards 32 and stakes 30 forming the remainder of the side kit to be stored interiorly of the headache rack and also provides storage for other accessories such as load tie down chains and the like. This arrangement enables all of the side kit components to be stored immediately forwardly of the flat bed trailer thereby simplifying the removal and storage of the side kit components from the flat bed trailer and also simplifying and reducing the time and work involved in reassembling the side kit components with a flat bed trailer. When the side kit components are assembled with a flat bed trailer, the top cap 76 may be locked to the bottom pan by duplicative lock structure on the bottom pan thereby providing storage space interiorly of the bottom pan and top cap when assembled together for accessories such as load tie down chains and the like.

The combination headache rack and side kit storage compartment of the present invention provides an effective protector device for the driver or cab occupants which is mounted behind the cab of the truck and provides convenient storage for the flat bed side kit which results in easy access of the side kit to the driver as compared to arrangements in which the side kit is stored under the trailer which requires considerable hard work and is time consuming. Thus, the present invention complies with safety regulations and provides a storage area for various accessories and enables a truck operator to haul more payload without exceeding weight limits thereby increasing revenue generated by the truck by reducing the weight of a conventional separate headache rack and eliminating occupation of payload space which occurs when the side kit components are stored on top of the flat bed and, of course, reducing the workload and enhancing convenience as compared with a side kit stored under the trailer. Also, positioning the combination headache rack and storage area forwardly of the trailer enables some loads to be hauled that require that a portion of the load hangs over the front of the trailer thereby enabling a truck operator to haul substantially any load without restriction to enable the driver to more efficiently use the truck and trailer.

Most of the components of the invention may be constructed of lightweight aluminum with the bolts preferably being constructed of stronger steel. The dimensional characteristics of the device may vary and in some instances, the tailgate may include conventional grain traps 88. In one practical embodiment of the invention, the overall width of the headache rack when assembled is slightly less than eight feet, the height thereof including the stands may be slightly less than six feet and the front-to-rear width may be approximately one foot with the height of the flanges on the bottom pan and top cap being approximately four inches and the height of the stand being approximately one and one-half feet so that the bottom pan generally is at the same horizontal level as the flat bed trailer so that the side kit components including the tailgate and headboard can be easily moved between the trailer and the bottom pan when assembling and disassembling the components of the combined headache rack and storage compartment when forming the headache rack and storage compartment and when removing these components and reassembling them onto the flat bed trailer.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A combined trailer headache rack and side kit component storage compartment adapted to be mounted rearwardly of a truck cab and forwardly of a trailer connected with the truck for towing comprising a pair of supporting stands adapted to be rigidly attached to the truck frame rails rearwardly of the cab and extending upwardly therefrom, a bottom pan supported rigidly between the upper ends of said stands, said bottom pan including spaced stake sockets along the front and rear edge thereof for receiving the stakes on a front headboard and tailgate removed from a flat bed trailer for storing the front headboard and tailgate on the bottom pan in spaced relation to form a space for receiving the side boards and stakes removed from a flat bed trailer when converting the side kit trailer to flat bed use and means rigidly securing the removed flat bed components to the bottom pan to form a headache rack to protect the driver of the truck from forwardly shifting loads when the flat bed trailer does not include a headboard mounted thereon and providing a convenient storage area for the side kit components to enable them to be more easily stored and more easily assembled onto the flat bed trailer.

2. The structure as defined in claim 1 wherein said combination headache rack and storage compartment includes a top cap overlying and engaging the upper edges of the headboard and tailgate when mounted on the bottom pan for retaining these components in assembled relation and closing the upper end of the storage space between the headboard and tailgate.

3. The structure as defined in claim 2 wherein each headboard and tailgate includes a lateral flange having vertical edges in substantially abutting relation when assembled on the bottom pan to form a closed storage space for side boards and stakes as well as accessories such as tie-down chains and the like.

4. The structure as defined in claim 3 together with means securing the top cap in place to retain the components assembled and prevent unauthorized removal thereof.

5. The structure as defined in claim 4 wherein said means retaining the headboard and tailgate in assembled relation includes a bolt arrangement securing the headboard to the bottom pan with the top cap securing the tailgate to the bottom pan when the top cap is secured to the headboard and tailgate.

6. The structure as defined in claim 5 wherein each stand includes a right-angular member including a generally horizontal base and vertical leg rigid therewith with diagonal brace members and vertical brace members interconnecting the base and leg and the base and bottom pan respectively, and clamp bolt means securing the base to the truck frame rails rearwardly of the cab and forwardly of the trailer.

7. In combination with a towing vehicle and a towed trailer in which the trailer is a flat bed trailer having removable side kit components attached thereto to enable the trailer to be converted between a flat bed trailer and a trailer with upstanding side boards, headboard and tailgate secured removably to the flat bed trailer by stakes received in stake pockets peripherally of the flat bed trailer, said towing vehicle including a cab and longitudinally extending frame rails projecting rearwardly therefrom to which the trailer is connected, a headache rack and side kit storage compartment combination comprising a transversely extending bottom support adapted to be supported rigidly from the towing vehicle frame rails and including duplicative stake sockets for receiving the stakes supporting the headboard and tailgate from the flat bed trailer with the duplicative sockets being spaced to provide a storage space between the headboard and tailgate for the side boards and stakes to support the side kit components from the transverse support member and forming a headache rack in the form of a structural barrier oriented vertically behind the cab of the towing vehicle for protecting the operator of the towing vehicle from forwardly shifting loads.

8. The combination as defined in claim 7 together with means rigidly and detachably securing the headboard and tailgate to the transverse support member, a top cap extending across, connected with and forming a closure between the upper ends of the headboard and tailgate, said headboard and tailgate including projecting flange means at each end edge with the flange means being disposed in abutting engagement when the headboard and tailgate are assembled on the support member to provide a closed storage area for the side boards and stakes and also a storage area for accessories.

9. The combination as defined in claim 8 wherein said support member includes a bottom pan in which the duplicate stake sockets are oriented at the forward and rearward wall thereof, and supporting stands supporting the bottom pan from the frame rails in elevated relation thereto and generally in alignment with the horizontal surface of the flat bed to facilitate conversion of the flat bed trailer and conversion of the side kit components on the flat bed trailer to a headache rack and storage compartment.

* * * * *